United States Patent [19]

Okada

[11] 4,305,144
[45] Dec. 8, 1981

[54] OPTICALLY REPRODUCING AND TRACKING SYSTEM FOR SPIRAL INFORMATION TRACK

[75] Inventor: Kazuo Okada, Amagasaki, Japan

[73] Assignee: Mitsubishi Denki Kabushiki Kaisha, Tokyo, Japan

[21] Appl. No.: 102,524

[22] Filed: Dec. 11, 1979

Related U.S. Application Data

[63] Continuation of Ser. No. 875,504, Feb. 6, 1978, abandoned.

[30] Foreign Application Priority Data

Feb. 9, 1977 [JP] Japan .................................. 52-13583

[51] Int. Cl.³ .......................... G11B 21/10; G11B 7/00
[52] U.S. Cl. ........................................ 369/46; 369/275
[58] Field of Search ............... 358/127, 128.5, 128.6; 179/100.1 G, 100.3 V, 100.3 G; 369/44, 46, 275

[56] References Cited

U.S. PATENT DOCUMENTS

| | | | |
|---|---|---|---|
| T953,002 | 12/1976 | Firester | 179/100.3 G |
| 3,913,076 | 10/1975 | Lehureau et al. | 179/100.3 V |
| 3,919,465 | 11/1975 | Adler et al. | 179/100.3 V |
| 3,931,459 | 1/1976 | Korpel | 179/100.3 V |
| 4,011,400 | 3/1977 | Simons et al. | 179/100.3 V |
| 4,051,527 | 9/1977 | Braat | 179/100.3 G |
| 4,051,529 | 4/1977 | Miyaoka | 179/100.3 V |
| 4,057,833 | 11/1977 | Braat | 179/100.3 V |
| 4,058,834 | 11/1977 | Miyaoka | 179/100.1 G |
| 4,059,841 | 11/1977 | Bricot et al. | 179/100.3 V |
| 4,065,786 | 12/1977 | Stewart | 179/100.3 V |

*Primary Examiner*—Bernard Konick
*Assistant Examiner*—Donald McElheny, Jr.
*Attorney, Agent, or Firm*—Wenderoth, Lind & Ponack

[57] ABSTRACT

A tracking mirror reflects monochromatic divergent light toward a rotating record disc provided with an engraved spiral track. The reflected light is focussed, as an optical spot, on the track by a collecting lens. Light reflected from and diffracted by the track is focussed onto an optical detector in a diffraction pattern including a principal maximum and bilaterial secondary maxima. The optical detector detects the principal maximum to form a reproduced signal and differentially detects the secondary maxima to produce a tracking signal. The mirror along with the lens and optical detector unit is moved in response to the tracking signal to cause the optical spot to follow the track.

7 Claims, 12 Drawing Figures

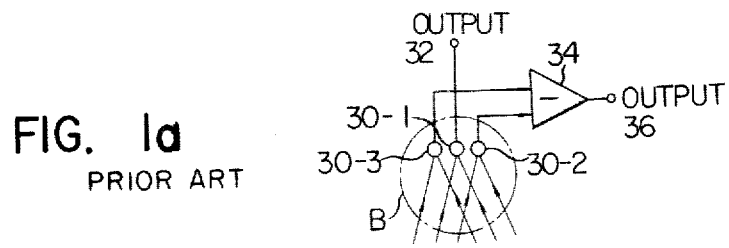
FIG. 1a PRIOR ART
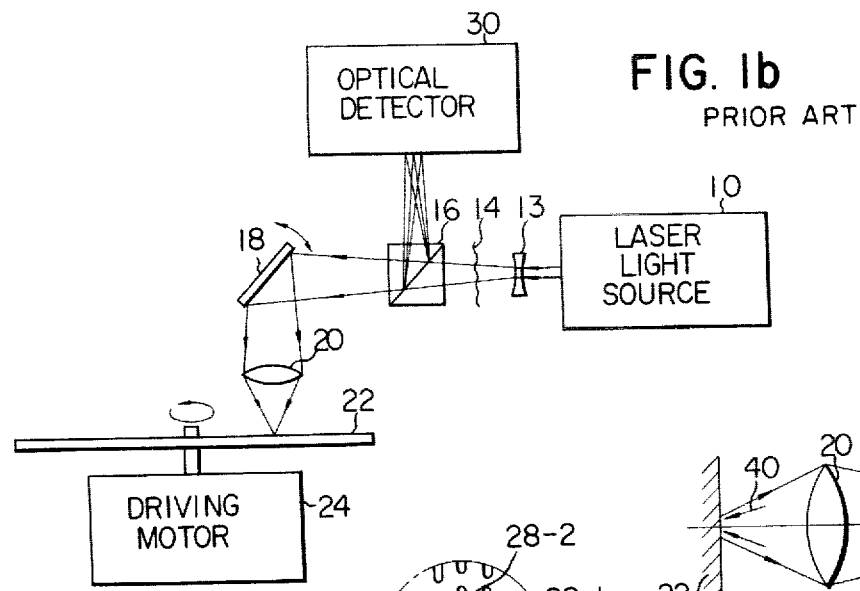
FIG. 1b PRIOR ART
FIG. 1c PRIOR ART
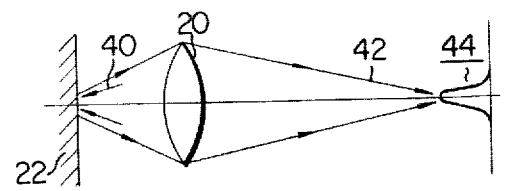
FIG. 2a
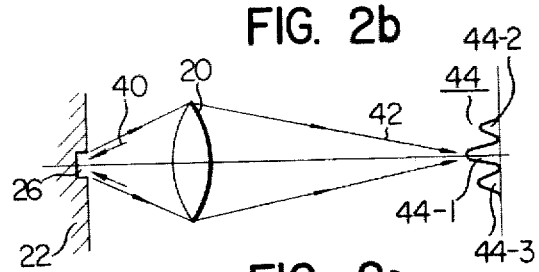
FIG. 2b
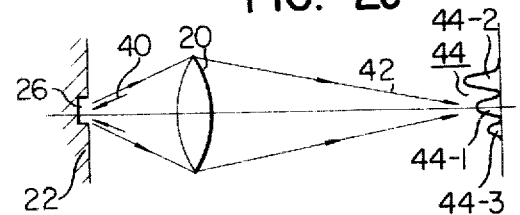
FIG. 2c
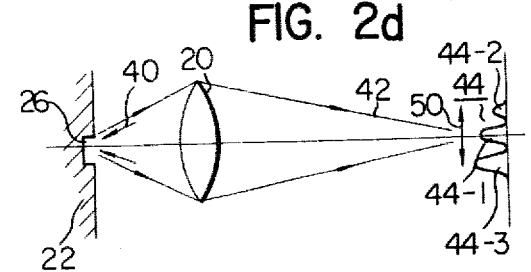
FIG. 2d

OPTICALLY REPRODUCING AND TRACKING SYSTEM FOR SPIRAL INFORMATION TRACK

This is a continuation application of Ser. No. 875,504, filed Feb. 6, 1978, now abandoned.

BACKGROUND OF THE INVENTION

The present invention relates to an optical reproducing system for optically reproducing signals such as voices or images recorded in concave and convex areas on a record medium, for example, a record disc.

Conventional systems for optically reproducing such a signal have commonly utilized three beams of diffracted light with the zero order and plus and minus first orders produced by the diffraction grating to reproduce the signal while producing a control signal that causes the three beams of diffracted light focussed on the record disc to follow the information track thereon. Conventional systems of the type referred to have inevitably employed a complicated optical system including a diffraction grating and associated optical components and have made it troublesome to adjust optical spots into which the beams of diffracted light with the first order are focussed with respect to the information track. Further, the resulting beam of light for reading has been weakened because of loss of light.

Accordingly it is an object of the present invention to provide a new and improved system for optically reproducing a signal engraved on a record medium by using a single beam of monochromatic light with a simple optical system without the necessity of using a diffraction grating.

SUMMARY OF THE INVENTION

The present invention provides an optical reproducing system for optically reproducing a signal recorded on a medium, comprising a rotating disc-shaped record medium including a spiral information track along which a signal is engraved, a collecting lens means for focussing a beam of monochromatic light on the disc-shaped record medium, an optical detector means, the collecting lens means also focussing a beam of light reflected from and diffracted by the information track on a plurality of surface portions of the optical detector means, the focussed beam of light on the optical detector means forming a diffraction pattern including a principal maximum due to a diffracted light component with the zero order and secondary maxima due to diffracted light components with the first order located on both sides of the principal maximum, a signal generator means connected to the optical detector means to generate both a reproduced signal corresponding to the signal recorded on the disc and a control signal on the basis of outputs from the optical detector means, and a moving means responsive to the control signal to move the collecting lens means and the optical detector means together to cause the focussed beam of monochromatic light to track the information track on the rotating record medium.

In a preferred embodiment of the present invention the optical detector means may comprise three optical detectors disposed to receive the principal and secondary maxima of the diffraction pattern respectively, the optical detector receiving the principal maximum detects the diffracted light component with the zero order to provide the reproduced signal and the signals from the optical detectors receiving the secondary maxima of the diffraction pattern are subtracted in the signal generator means to differentially detect the diffracted light components with the first order to provide the control signal.

In another preferred embodiment of the present invention the optical detector means may comprise a pair of optical detectors disposed to be assigned to respective halves of the diffraction pattern with the signal generator means adding the outputs from both optical detectors to each other to provide the reproduced signal while subtracting those outputs from each other to provide the control signal.

BRIEF DESCRIPTION OF THE DRAWINGS

The present invention will become more readily apparent from the following detailed description taken in conjunction with the accompanying drawings in which:

FIGS. 1a through 1c are diagrams of a conventional system for optically reproducing an image signal;

FIGS. 2a through 2d are diagrams of an optical system useful in explaining the principles of the present invention;

FIG. 5b is an electric circuit diagram of a modification of one portion of the arrangement shown in FIG. 5a.

Throughout the Figures like reference numerals designate the identical or corresponding components.

DESCRIPTION OF THE PREFERRED EMBODIMENTS

Figure 3:
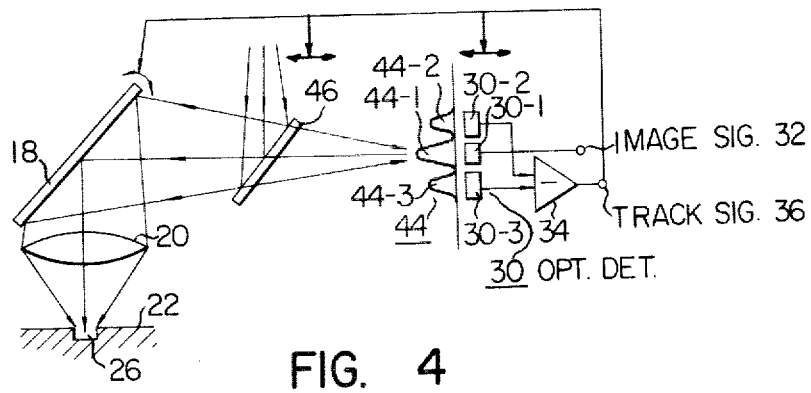
FIG. 3 is a diagram of a system for optically reproducing an image signal constructed in accordance with the principles of the present invention.

Referring now to FIGS. 1a, 1b and 1c of the drawings, there is illustrated a conventional system for optically reproducing an image signal. The arrangement illustrated has been used to detect or to read signals for voices and images engraved in a record disc by using monochromatic light, for example, laser light, and to sense deviation in a radial direction of the optical spot of the monochromatic light from an associated information track on the record disc. In FIG. 1b laser light from a source of laser light 10 passes through a divergent lens such as a concavo-concave lens 13 to form a divergent beam of light which is, in turn, converted to three beams of diffracted light with the zero order, and plus and minus first orders by a diffraction grating 14. The three beams of diffracted light are passed through a beam-splitter 16 and reflected from a tracking mirror 18 to turn their optical paths through a right angle. The reflected beams fall on a collecting lens 20 to be focussed, as optical spots, on a disc-shaped record medium 22 having voice signals and/or image signals engraved along a spiral information track (not shown) thereon. The disc 22 is rotated at a predetermined constant speed and in the direction as shown at the arrow by a driving electric motor 24.

One portion of the surface of the record disc 22 is shown in an enlarged scale within a circle labelled A of FIG. 1c. In the circle A three portions of the information track 26 are shown as being formed of parallel strings of oblate circles which are in the form of pits indicating portions of an engraved track. A dot 28-1 is located in one oblate circle of the middle string on the central line and a pair of dots 28-2 and 28-3 are located in adjacent oblate circles thereof on the right and the sides of the central line, respectively, so as to partly project therefrom. The dot 28-1 designates an optical spot into which the beam of diffracted light with the zero order is focussed while the dots 28-2 and 28-3 designate optical spots into which the beams of diffracted light with the plus and minus first orders are focussed respectively.

Therefore it is seen that the optical spot 28-1 or the focussed beam of diffracted light with the zero order scans the information track 26 while the optical spots 28-2 and 28-3 or the focussed beams of diffracted light with the first order scan the right and left sides of the central line of that information track 26 being scanned by the optical spot 23-1.

Respective beams of reflected light originating from the optical spots 28-1, 28-2 and 28-3 are passed through the collecting lens 20 and reflected from the tracking mirror 18 to fall on the beam splitter 16. The beam splitter 16 projects the three beams of light on an optical detector unit 30.

As shown in an enlarged scale within a circle labelled B of FIG. 1a, the optical detector unit 30 includes three optical detectors 30-1, 30-2 and 30-3 on which the light beams originating from the respective optical spots 28-1, 28-2 and 38-3 are focussed or collected. Under these circumstances, the optical detector 30-1 delivers to an output 32 an electrical signal reproduced from an associated information track on the rotating disc 22. Outputs from the optical detectors 30-2 and 30-3 are applied to an operational amplifier 34 where they are subtracted from each other to provide a signal indicating deviations of the optical spot 28-1 from the central line of the information track. That signal is called a tracking signal and is delivered to another output 36 to control the movement of the tracking mirror 18.

The tracking mirror 18 is arranged to be moved parallel to a radial line of the record disc 22 while the source 10, the divergent lens 13, the diffraction grating 14, the beam splitter 16, the collecting lens 20, and the optical detector unit 30 are moved along with the mirror 18.

Conventional image reproducing systems such as shown in FIGS. 1a, 1b and 1c are disadvantageous in that the reading light beam is reduced in intensity because of the absorption of light by the diffraction grating and the optical losses due to higher order diffractions as well as to the beams of diffracted light with the plus and minus first orders. In addition, it has been extremely troublesome to adjust the optical spots 28-2 and 28-3 with respect to the information track and the use of surplus components such as the diffraction grating, and others results in an expensive construction.

The present invention contemplates elimination of the disadvantages of the prior art practice as above described by the provision of an optical reproducing system for forming an image signal and a tracking signal employing a single beam of monochromatic light without the necessity of forming three beams of diffracted light by a diffraction grating.

The principles of the present invention will now be described in conjunction with FIGS. 2a through 2d. In those Figures a beam of convergent light 40 incident upon the record disc 22 is reflected therefrom and focussed in a focussing plane (not shown) by the collecting lens 20 as shown by line 42, the lens 20 having its optical axis orthogonal to the surface of the record disc 22.

It is assumed that, as shown in FIG. 2a, the beam of convergent light 40 falls on a portion of the disc including no pit indicating one of the oblate circles along the information track 26 (see circle A, FIG. 1c). Under these assumed conditions, the beam of focussed light 42 has an intensity profile 42 including a single maximum as shown in FIG. 2a.

FIG. 2b shows the collecting lens 20 centered on one pit 26 on the record disc 22, that is to say, the collecting lens 20 has its optical axis passing through the center line of the pits 26. The resulting intensity profile or diffraction pattern includes the principal maximum 44-1 on the optical axis of the collecting lens 18 and a pair of secondary maxima 44-2 and 44-3 smaller than the principal maximum 44-1 and symmetrically disposed on both sides of the latter. The secondary maxima are equal in magnitude to each other. The principal maximum 44-1 results from a beam of diffracted light with the zero order reflected from the record disc 22 and the secondary maxima 44-2 and 44-3 result from a pair of beams of diffracted light with the plus and minus first orders reflected from the disc 22.

FIG. 2c shows the collecting lens 20 off center relative to the pit 26. In this case, the optical axis of the collecting lens 20 deviates from the central line of the pits in a downward direction as viewed in FIG. 2c. The resulting diffraction pattern is not symmetric with respect to the optical axis of the collecting lens 18 so that secondary maximum 44-2 has the largest magnitude and is located on that side of the optical lens 18 axis opposite to the side thereof nearest to the wall of the pit 26. The other secondary maximum 44-3 has the smallest magnitude.

FIG. 2d shows the collecting lens 18 off center relative to the pit 26 in a direction opposite to that illustrated in FIG. 2c. Thus the resulting diffraction pattern 44 is reversed from that shown in FIG. 2c.

The intensity profiles or diffraction patterns as shown in FIGS. 2a through 2d have been confirmed by both the theory of diffraction and experiments. It has been found that, by rendering the diameter of the beam of convergent light 40 on the disc 22 equal to two or three times the width of the pit 26, one of the secondary maxima can have a sufficiently large magnitude exceeding, for example, 60% of the magnitude of the principal maximum. As an example, it is assumed that the beam of convergent light has a diameter of 2 $\mu$m on the disc 22, and the pit has a width of 0.8 $\mu$m and a depth imparting to the beam a phase difference of $\lambda/4$ where $\lambda$ designates the wavelength of the light involved. Under these assumed conditions, it is apparent from diffraction analysis that a displacement of 0.4 $\mu$m of the pit imparts to be secondary maxima of the diffraction pattern relative magnitudes of unity (1) and 0.2 respectively.

From the foregoing it is seen that a tracking signal can be provided through the differential detection of both secondary maxima and that a voice signal and/or an image signal can be obtained by detecting the principal maximum, either one of the secondary maxima or the principal and secondary maxima of the diffraction pattern as a whole.

The present invention is based upon the diffraction patterns as described above in conjunction with FIG. 2. The optical reproducing system of the present invention can be constructed as shown in FIG. 3 wherein there are illustrated only those components contributing to the essential part of the present invention. In the arrangement illustrated monochromatic light, for example, laser light from a source of laser light first passes through a divergent lens and then the resulting beam of divergent light is reflected from a semitransparent mirror 46 to travel toward the tracking mirror 18. The source and lens may be similar to the source 10 and the concavo-concave lens 13 as shown in FIG. 1b but the two structures are not illustrated in FIG. 2 for purposes of brevity. As in the arrangement of FIG. 1b, the collecting lens 20 focusses the beam of light reflected from the tracking mirror 18 on that pit 26 on the rotating record disc 22 centered by the lens 18 to form an optical spot.

Then a beam of light reflected from and diffracted by the pit 42 passes through an optical path including the collecting lens 20 and the mirrors 18 and 46 to be collected by the optical detector unit 30. The optical detector unit 30 includes three optical detectors 30-1, 30-2 and 30-3 disposed in a line in a plane orthogonal to the optical path as above described to receive respectively the principal maximum 44-1 and the secondary maxima, 44-2 and 44-3 of the diffraction pattern 44 as described above in conjunction with FIG. 2b. That is, the beam of light from the pit 26 falls on the three optical detectors 30-1, 30-2 and 30-3 to form a difraction pattern whereby the principal maximum 44-1 thereof is received by the central detector 30-1 to provide a voice signal and/or an image signal at the output 32 connected thereto and the secondary maxima 44-2 and 44-3 thereof are received by the bilateral detectors 30-2 and 30-3 respectively. As in the arrangement of FIG. 1a, the operational amplifier 34 connected to the optical detectors 30-2 and 30-3 forms a signal difference between the signals corresponding to secondary maxima 44-2 and 44-3 of the diffraction pattern 44 and delivers it, as a tracking signal, to the output 36.

The output 36 is connected to a moving means shown schematically by the double-headed curved arrow in FIG. 3 and therefore the tracking signal is operative to control the tracking mirror 18 so as to cause the optical spot formed on the disc 22 by the collecting lens 20 to precisely track the information track 26 on the rotating disc 22.

The tracking mirror 18 and all the associated optical components are arranged to be moved in the same manner as described above in conjunction with FIG. 1b as illustrated schematically by the double-headed arrows near beam splitter 46 and optical detector unit 30. Note that the movement of these optical components should be coordinated to keep optical detector unit 30 at the focal point of light reflected from or diffracted by the spiral information track. If desired, the source of monochromatic light need not be moved with the tracking nirror 18.

From the foregoing it is seen that the arrangement of FIG. 3 forms a diffraction pattern including the principal maximum and bilateral secondary maxima on both sides thereof as above described in conjunction with FIG. 2 and that the principal maximum forms a voice signal and/or an image signal while both secondary maxima form a tracking signal operative to cause the beam of light focussed on the disc to track an information track thereon.

The form of the present invention as shown in FIG. 3 is advantageous over the conventional arrangement of FIGS. 1a and 1b in that the degree of modulation for reproduction is distinctively higher. In the arrangement of FIGS. 1a and 1b, the decrease in the intensity of light reflected from any pit on the disc results only from some of reflected light passing outside the aperture of the collecting lens 18 due to the diffraction. However, in the arrangement of FIG. 3, only the principal maximum of the diffraction pattern resulting from the pits on the disc is detected and no secondary maximum thereof is detected. Therefore the decrease in the intensity of reflected light becomes large as compared with the conventional measure such as shown in FIGS. 1a and 1b, resulting in a higher degree of modulation.

Figure 4:
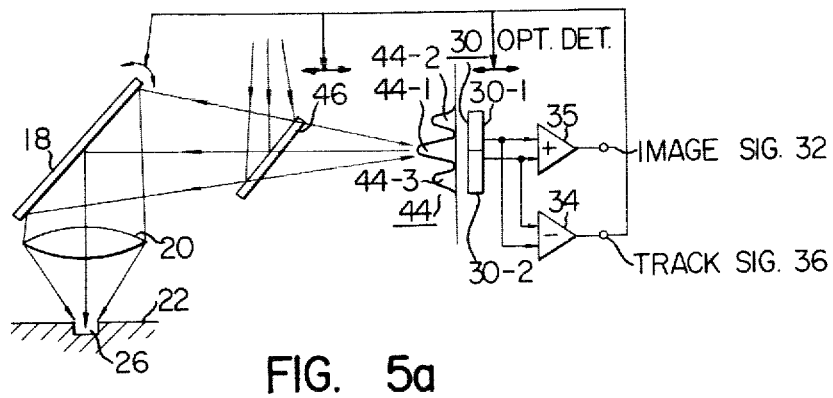
FIG. 4 is a diagram similar to FIG. 3 but illustrating a modification of the present invention.

FIG. 4 shows a modification of the present invention wherein a pair of optical detectors are substituted for the three optical detectors. In FIG. 4 a pair of optical detectors 30-1 and 30-2 are formed by dividing an optical detector into two equal portions divided along the central line of the principal maximum of the diffraction pattern. That is, the pair of optical detectors 30-1 and 30-2 are assigned to respective halves of the diffraction pattern.

Then the sum of outputs from the two optical detectors 30-1 and 30-2 is formed by an operational amplifier 35. Thus amplifier 35 delivers the image signal to the output 32. On the other hand, the operational amplifier 34 forms a difference signal between those two outputs to deliver a tracking signal to the output 36.

In other respects, the arrangement is identical to that shown in FIG. 3.

Figure 5A:
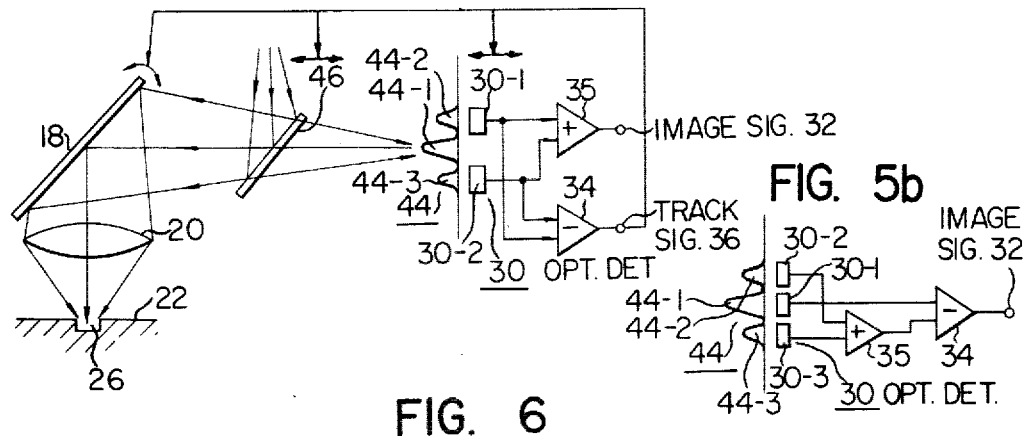
FIG. 5a is a diagram similar to FIG. 3 but illustrating another modification of the present invention.

The arrangement shown in FIG. 5a is different from that illustrated in FIG. 4 only in that in FIG. 5a the pair of optical detectors 30-1 and 30-2 are spaced away from each other so that the secondary maxima of the diffraction pattern fall on respective optical detectors. As in the arrangement of FIG. 4, the outputs from the optical detectors 30-1 and 30-2 are added to each other by the operational amplifier 35 resulting in an image signal while the difference between those outputs is formed by the operational amplifier 34 resulting in a tracking signal.

In the arrangment of FIG. 5a, when the optical spot due to the collecting lens 18 falls on a pit on the record disc 22, the resulting signal has its intensity increased, not decreased as in the prior art practice. More specifically, when the optical spot does not fall on a pit, the resulting signal has a null intensity because beams of diffracted light with the first order have zero intensities in the absence of a pit on the record disc. Therefore the arrangement of FIG. 5a is very advantageous in that the resulting degree of moduration can be near 100%.

Figure 5B:
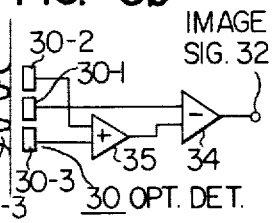

The arrangement illustrated in FIG. 5b is different from that shown in the FIG. 3 only in combinations of the outputs from the three optical detectors 30-1, 30-2 and 30-3. As shown in FIG. 5b, the outputs from the optical detectors 30-2 and 30-3 are applied to the operational amplifier 35 to be added to each other while the output from the optical detector 30-1 is applied to the operational amplifier 34 together with the output from the operational amplifier 35. Thus the operational amplifier 34 forms the difference between the output from the optical detector 30-1 and the sum of the outputs from the optical detectors 30-2 and 30-3 to deliver an image signal to the output 32. In other words, the image signal is formed of a difference between the image signal provided by the arrangement shown in FIG. 3 and that provided by the arrangement of FIG. 5a. Thus the resulting image signal becomes strong.

Figure 6:
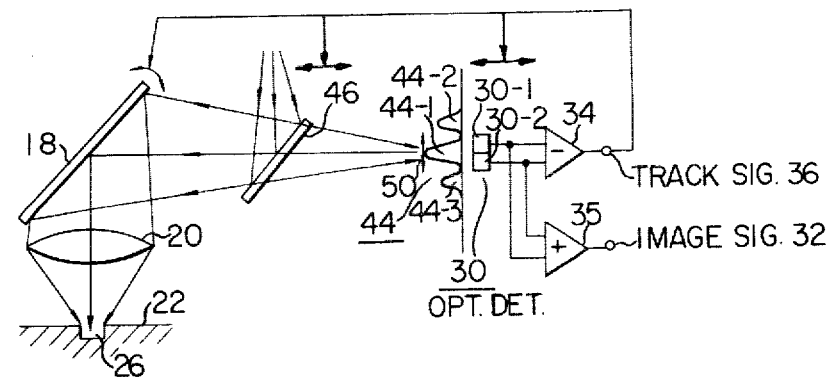
FIG. 6 is a diagram similar to FIG. 3 but illustrating still another modification of the present invention.

In the arrangements shown in FIGS. 3 through 5 the tracking signal is formed by utilizing the unbalance of bilateral secondary maxima of the diffraction pattern but it is to be understood that the tracking signal may be generated by utilizing the positional shift of the principal or secondary maxima thereof. In the latter case, the present invention can be modified as shown in FIG. 6. The arrangement illustrated is different from that shown in FIG. 5a only in that in FIG. 6, a pair of optical detectors 30-1 and 30-2 are connected together and located to receive only the principal maximum of the resulting diffraction pattern. Then the outputs of the optical detectors 30-1 and 30-2 are connected to the two operational amplifiers 34 and 35 in the same manner as shown in FIG. 5a.

The theory of diffraction provides that, when a pit 46 on the record disc 22 is displaced with respect to a corresponding optical spot formed by the collecting lens 20, the principal maximum of the resulting diffraction pattern is slightly shifted in a direction as determined by the direction of displacement of the pit as shown by the double-headed arrow 50 in FIGS. 2d and 6.

The arrangement of FIG. 6 utilizes the phenomenon as above described to generate a tracking signal from the difference between the outputs from the optical detectors 30-1 and 30-2 on which the principal maximum of the diffraction pattern falls. An image signal is formed of the sum of the outputs from both optical detectors 30-1 and 30-2. Alternatively it may be modified to form the image signal of the bilateral secondary maxima of the diffraction pattern as in the arrangement of FIG. 5a.

From the foregoing it is seen that the present invention provides an optical reproducing system utilizing a single beam of light to generate both an image signal and a tracking signal. The system increases the signal-to-noise ratio and has a excellent vibration resistance while being inexpensive to manufacture.

While the present invention has been illustrated and described in conjunction with several preferred embodiments thereof it is to be understood that numerous changes and modifications may be resorted to without departing from the spirit and scope of the present invention.

What is claimed is:

1. An optical reproducing system for optically reproducing information stored in a record medium comprising:
    a source of monochromatic light having a wavelength λ;
    a rotating disc-shaped record medium having a spiral information track formed of a series of pits, each of said pits having a depth of λ/4, and upon which said information is stored;
    a collecting lens disposed in a position for focussing said monochromatic light from said source onto said disc-shaped record medium;
    an optical detector means having a plurality of optical detection portions, each of said plurality of portions producing an electrical signal corresponding to the intensity of light falling thereon; said detector means disposed in a position whereby said collecting lens focusses said monochromatic light reflected from and diffracted by said spiral information track of said disc-shaped record medium onto said optical detector means in a diffraction pattern including a principal maximum due to a diffraction component of the zero order and secondary maxima on either side of said principal maximum due to diffraction components of the first order;
    a signal generator means connected to said optical detector means for generating both a reproduced signal corresponding to said information stored upon said spiral information track and a control signal indicative of the position of said focussed monochromatic light relative to said spiral information track; and
    a moving means connected to said source of monochromatic light, said collecting lens, said optical detector means and said signal generator means for moving said source of monochromatic light, said collecting lens and said optical detector means in response to said control signal, wherein said focussed monochromatic light follows said spiral information track of said disc-shaped record medium.

2. An optical reproducing system as claimed in claim 1 wherein:
    said plurality of optical detection portions of said optical detector means comprises first and second optical detection portions disposed in positions whereby said collecting lens focusses said secondary maxima due to diffraction components of the first order on respective optical detection portions; and
    said signal generator means comprises a difference means connected to said first and second optical detection portions for generating said control signal from the difference of said electrical signal of said first optical detection portion and said electrical signal of said second optical detection portion.

3. An optically reproducing system as claimed in claim 1 wherein said optical detector means detects said diffracted component with the zero order to provide said reproduced signal.

4. An optically reproducing system as claimed in claim 1 wherein said optical detector means comprises an optical detector divided into two detector portions to detect said diffracted light components with the zero and first order and there are provided means for forming a difference between outputs from said detector portions to provide said control signals and means for forming the sum of said outputs to provide said reproduced signal.

5. An optically reproducing system as claimed in claim 1 wherein said optical detector means comprises a pair of optical detectors, said pair of optical detectors detecting said diffracted light components with the first order respectively and there are provided means for forming a difference between outputs from said optical detectors to provide said control signal and means for forming the sum of said outputs to provide said reproduced signal.

6. An optically reproducing system as claimed in claim 1 wherein said optical detector means detect both said diffracted light component with the zero order and said diffracted light components with the first order and there are provided means for forming a difference between said diffracted light components with the zero order and the sum of said diffracted light components with the first order to provide said reproduced signal.

7. An optically reproducing system claimed in claim 1 wherein said optical detector means comprises an optical detector divided into a pair of detector portions to detect said diffracted light component with the zero order alone and there are provided means for forming a difference between outputs from said pair of optical detector portions to provide said control signal and means for forming the sum of said outputs to provide said reproduced signal.

* * * * *